United States Patent
Spahlinger

(10) Patent No.: US 7,190,463 B2
(45) Date of Patent: Mar. 13, 2007

(54) METHOD FOR PREVENTING BIAS-ERRORS AS A RESULT OF SYNCHRONOUS INTERFERENCE IN FIBER-OPTIC GYROSCOPES

(75) Inventor: Guenter Spahlinger, Stuttgart (DE)

(73) Assignee: LITEF GmbH, Freiburg (DE)

( * ) Notice: Subject to any disclaimer, the term of this patent is extended or adjusted under 35 U.S.C. 154(b) by 210 days.

(21) Appl. No.: 10/481,945

(22) PCT Filed: Jun. 20, 2002

(86) PCT No.: PCT/EP02/06860

§ 371 (c)(1),
(2), (4) Date: Jun. 25, 2004

(87) PCT Pub. No.: WO03/001153

PCT Pub. Date: Jan. 3, 2003

(65) Prior Publication Data

US 2004/0246488 A1   Dec. 9, 2004

(30) Foreign Application Priority Data

Jun. 22, 2001  (DE) .............................. 101 30 159

(51) Int. Cl.
*G01B 9/02*   (2006.01)
(52) U.S. Cl. ...................... 356/464; 356/460
(58) Field of Classification Search ................ 356/460, 356/462, 463, 464; 250/227.19, 227.27; 385/12
See application file for complete search history.

(56) References Cited

U.S. PATENT DOCUMENTS

| 4,545,682 | A |   | 10/1985 | Greenwood |
| 4,759,629 | A |   | 7/1988  | Everest et al. |
| 5,052,808 | A | * | 10/1991 | Hilby et al. ................. 356/464 |
| 5,162,871 | A | * | 11/1992 | Ishigami ...................... 356/464 |
| 5,953,122 | A |   | 9/1999  | Ecke et al. |

FOREIGN PATENT DOCUMENTS

| DE | 69007034  | 6/1991 |
| DE | 690122524 | 9/1991 |
| DE | 69204326  | 9/1992 |
| DE | 69423235  | 6/1995 |
| DE | 19748909  | 4/1999 |
| EP | 0441998   | 8/1991 |
| EP | 0551537   | 7/1993 |

* cited by examiner

*Primary Examiner*—Hwa (Andrew) Lee
*Assistant Examiner*—Denise B Anderson
(74) *Attorney, Agent, or Firm*—Elliott N. Kramsky

(57) ABSTRACT

The method according to the invention for preventing bias errors as a result of synchronous interference in fiber-optic gyroscopes (FOGs) provides for an additional signal $\phi_E$, which is periodical at the sampling clock rate and corresponds, for example, to a synchronous interference signal input to be added in the form of additional modulation to the modulation signal for a phase modulator within an MIOC. The demodulated detector signal from the FOG is preferably then correlated with the additional modulation, that is to say which is multiplied by the additional modulation and is added to it. The added-up signal, which is dependent on the error matching, controls a VCO (12) which readjusts the operating frequency of the FOG until the correlation tends to zero. The method can be used not only for phase ramp modulation but also for FOGs which operates using a random phase modulation method.

2 Claims, 10 Drawing Sheets

METHOD FOR PREVENTING BIAS-ERRORS AS A RESULT OF SYNCHRONOUS INTERFERENCE IN FIBER-OPTIC GYROSCOPES

The invention relates to a method for preventing bias errors as a result of synchronous interference in fiber-optic gyroscopes (FOGS), which are also referred to as fiber-optic gyros in the following text and based on the previous mechanical gyros.

Fiber-optic gyros are sensitive to electrical inputs into the optical phase modulator if the gyro is not operated exactly at an operating frequency which corresponds to the reciprocal of the delay time of the light through the fiber coil (measurement coil), with the input being a periodic function whose period is equal to the reciprocal of the operating frequency. Interference signals such as these—which are also referred to as synchronous interference—generally occur widely in the electronic part of the measurement system owing to the properties of the electronic control and modulation device. A theoretical system analysis of this effect is described in detail further below. One remedial measure against the bias or zero-point errors that occur in this case is to tune the operating frequency to the said ideal value, that is to say to the reciprocal of the time which the light takes to pass through the fiber coil. Since this ideal frequency does not have a constant value but, for example, depends on the temperature, the operating frequency should be readjusted continuously to the ideal value by means of a regulator.

The relationships described above have been known for a relatively long time and are described, for example, in U.S. Pat. No. 4,759,629, where VCO control is stated to be a remedial measure. This known measure has two significant disadvantages, however:

1. The known frequency readjustment method cannot be used for gyroscopes which operate using a stochastic or random phase modulation method as is described, for example, in EP 0 441 998 31 and in EP 0 551 537 B1.
2. In order that the frequency control can operate in the desired sense, the regulator must be provided with information relating to the current discrepancy between the operating frequency and the ideal value. According to the teaching of the cited US patent, the magnitude of this discrepancy is represented by the area of pulses. The mathematical sign of the discrepancy is in this case defined by the timing of a respective pulse with respect to a reference time, with the end of the pulse matching the reference time if the mathematical sign is positive, and matching its start if the mathematical sign if negative. If the frequency discrepancies are very small (in the ppm range), these pulses have a length of only a few ps (pico seconds). Since the mathematical sign is now obtained by the alignment of these narrow pulses with respect to the reference time, a detector circuit would have to be able to determine the pulse timing to an accuracy of a few ps. However, this is technically impossible, so that the specified method can lead to an incorrect mathematic sign in the region of small frequency discrepancies, in which the system is in fact preferably intended to operate, and therefore operates with only relatively large errors in the region of the zero point. It is even more important in this case that the frequency control process cannot use a linearly operating correlation method, by means of which the signal which is used for control purposes could also be filtered out of a noisy signal from the photo detector.

The invention is based on the object of specifying a better method and a circuit arrangement which is suitable for this purpose for preventing bias errors in fiber-optic gyroscopes, with these errors being caused by the synchronous interference signal inputs which have been mentioned.

The method according to the invention for preventing bias errors as a result of synchronous interference in fiber-optic gyroscopes (FOGs) having a closed control loop is characterized according to the invention in that additional modulation, which is periodic with respect to the reciprocal of the operating frequency of the gyroscope, is applied to the demodulated output signal from the FOG detector, the remainder of the additional modulation in the demodulated detector signal is detected, and the detected signal from the remaining additional modulation is used to drive an auxiliary control loop, which readjusts the operating frequency such that the additional modulation tends to zero within technically predeterminable or predetermined limits. The demodulated detector system is preferably correlated with the signal from the additional modulation, and the auxiliary control loop is driven by the correlated signal in order to readjust the operating frequency such that the correlation tends to zero within technically possible limits.

In principle, any detection method which is suitable for verification of "remainders" of the additional modulation is suitable for the purposes of the idea according to the invention, for example searching for specific features in the additional modulation, such as searching for a "discontinuity point" with sampling before and after it, and formation of the difference between the two sample values.

The method according to the invention thus differs fundamentally from the decorrelation method which is known from DE 197 48 909 C1 and which minimizes interference in the detector path of the FOG.

The invention and the theoretical system analysis which is helpful to understand it will be explained in more detail in the following text using an exemplary embodiment and with reference to the drawings, in which.

First of all, the following text contains a system analysis of the phase modulation in a Sagnac interferometer, taking into account synchronous interference signal inputs. The demodulation of a blanking filter will then be explained, in conjunction with the fundamental idea of the invention to add a signal φE, which is periodical of the sampling clock rate and is in the form of additional modulation, to the modulation signal at the phase modulator, preferably within a multifunctional integrated optical chip (MIOC).

1. THE ANALYSIS OF THE PHASE MODULATION IN A FIBER-OPTIC GYROSCOPE

First of all, the "physical gyropath" will be analysed during untuned operation with synchronous interference. The meanings of the signals are:

| | |
|---|---|
| $\psi_m$: | MIOC drive signal without interference |
| $\psi_s$: | Interference in the MIOC |
| $\psi_a$: | Sagnac phase |
| $T_0$: | Delay time of the light |
| $T$: | Clock time of the MIOC modulation, period of the interference |
| $\Delta T = T_0 - T$: | Clock time discrepancy |
| $\phi$: | Interferometric overall phase |
| $\alpha$: | Interferomatric phase without interference |
| $\beta$: | Interference, interferometric. |

Figure 1:
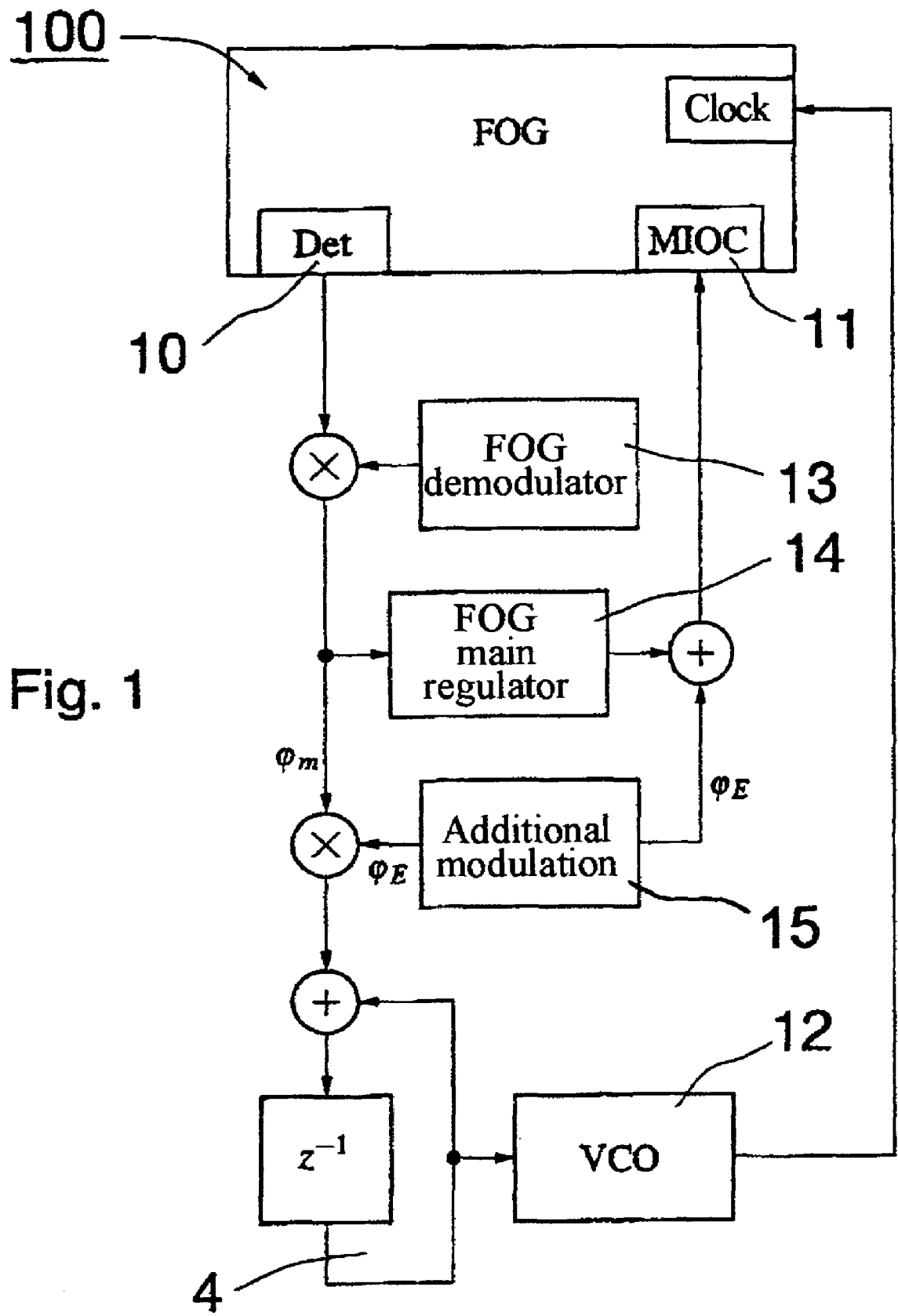
FIG. 1 shows a schematic block diagram of the architecture of an FOG with a detailed illustration of the operating frequency control according to the invention.
Figure 2:
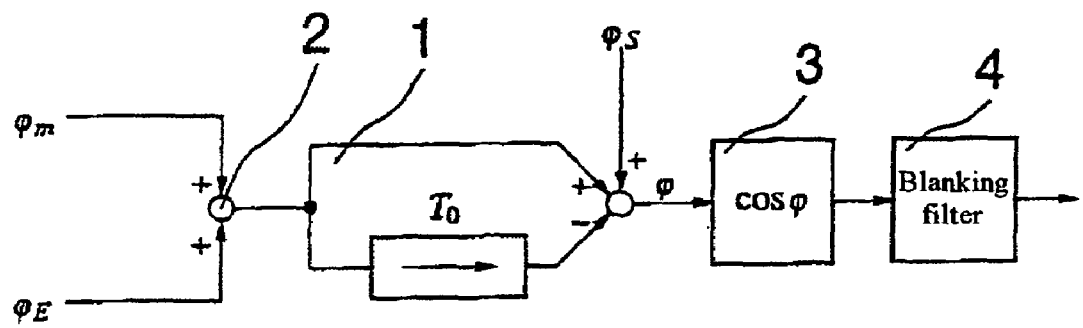
FIG. 2 shows a basic circuit model in order to explain what is meant by "synchronous interference"

The operation of the gyro during untuned operation and in the presence of synchronous interference is shown in FIG. 2, with the measurement coil of the interferometer being illustrated schematically and being identified by the reference symbol 1. Interference $\phi_E$ is added to the MIOC drive signal $\phi_m$, with respect to the drive signal without interference, in the phase modulator which is symbolically indicated by a circle 2; the sum of the two signals is the effective modulation signal at the MIOC. This signal has an interferometric effect in that the difference is formed from the undelayed signal and the signal delayed by the time $T_0$, that is to say the delay time of the light passing through the measurement coil of the interferometer. If the Sagnac phase φS is also added to this, then this results in the overall interferometric phase φ. The downstream block 3 with the transfer function φ represents the function of the interferometer, with the output signal being the normalized light power, from which any DC voltage components have been removed, at the (not illustrated in FIG. 2) photodetector 10 (FIG. 1) (or its output signal). This is followed by a block 4 which carries out the function of a filter and blanking filter—a continuous linear system with time-dependent parameters—as will be explained in more detail further below. The MIOC signal $\phi_m(t)$ without interference is (approximately) a staircase function with a stepwidth of T, the clock time of the modulation at the MIOC. The MIOC signal is constant for the time period of one step and can thus be described by a discrete value for each step. The sequence of these discrete values corresponds to a discrete signal with the sampling frequency $f_\lambda=1/T$. As mentioned, the interference signal or the interference $\phi_E$ is a function that is periodic in T; the same applies to the parameters of the blanking filter. Owing to the periodicity of $\phi_E$:

$$\phi_E(t+T)=\phi_E(t) \quad (1)$$

and $$\phi_E(t+T_0)=\phi_E(t-\Delta T) \quad (2)$$

Figure 3:
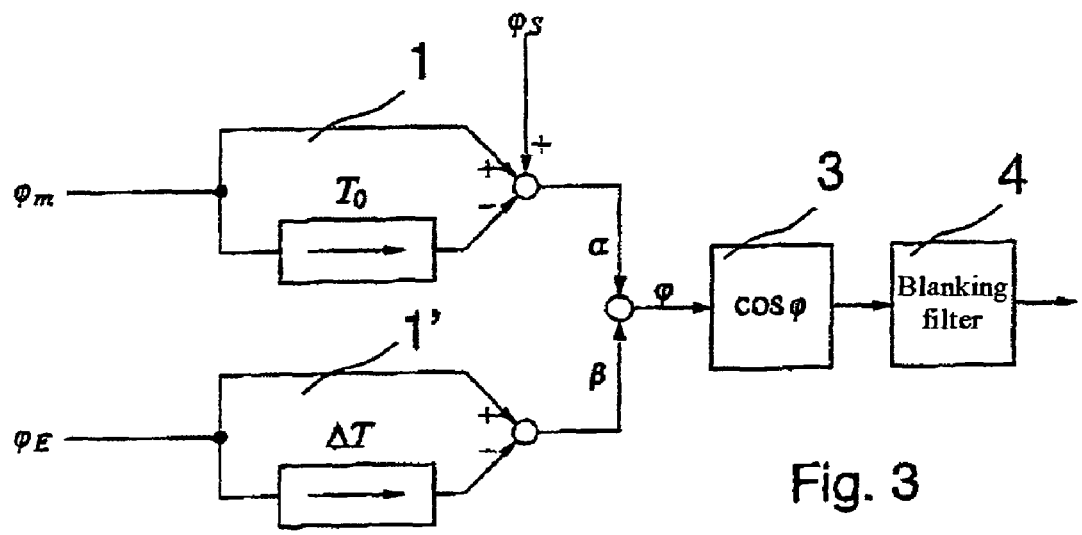
FIG. 3 shows a first modification of the model illustration in FIG. 2 for synchronous interference.

If the input paths are now split in the summation nodes of the interferometer shown in FIG. 2 into a part without interference including the Sagnac phase, and a part for the interference $\phi_E(t)$ using the linearity, and the relationship in equation (2) is taken into account for that second part, then the basic model shown in FIG. 2 is reproduced by the modified block diagram shown in FIG. 3. As can be seen in particular from this figure, when $\Delta T=0$, that is to say in the tuned situation, the interference $\phi_E(t)$ has no effect whatsoever.

Next, it is now assumed that the interference is small:

$$\phi_E(t)<<1 \quad (3)$$

so that, in addition:

$$\beta(t)=\phi_E(t)-\phi_Z(t-\Delta T)<<1 \quad (4)$$

The sum of the two angles, that is to say $\phi=\alpha+\beta$ is applied to the input of the block 3 with the interferometer transfer function cos φ. Since $$\cos(\alpha+\beta)=\cos\alpha\cos\beta-\sin\alpha\sin\beta \quad (5)$$

then, if $\beta<<<1$:

$$\cos\phi(t)=\cos\alpha(t)+\beta(t)\cdot\sin\alpha(t) \quad (6)$$

Figure 4:
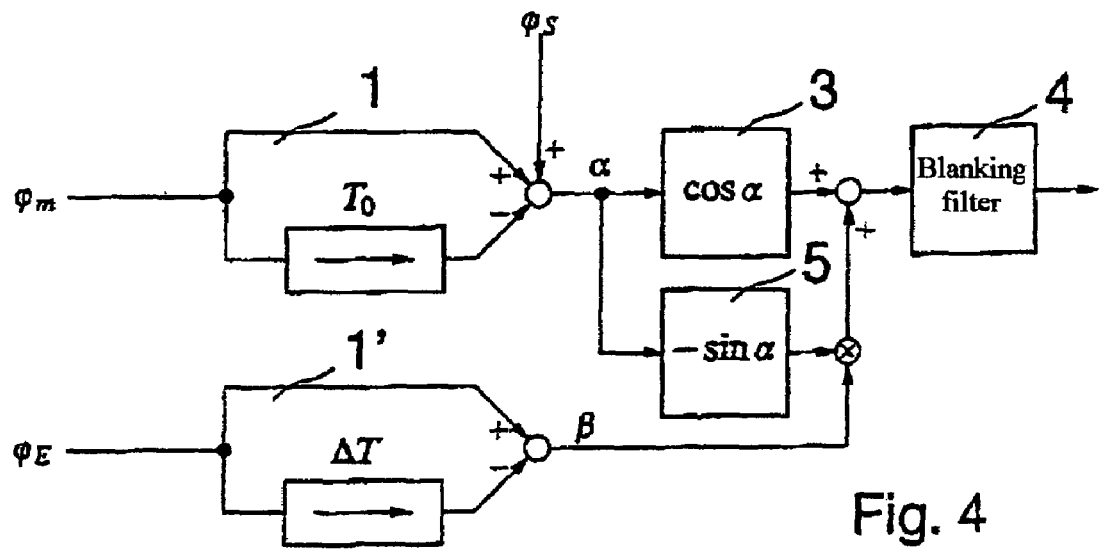
FIG. 4 shows a second modification of the model for synchronous interference.

This results in a second modification of the basic model shown in FIG. 2 as shown in the block diagram in FIG. 4, with the transfer function (−sin α) being represented by the block 5.

A further permissible simplification can be achieved, since $$\frac{d}{dt}\varphi E(t) = \lim_{\Delta T \to 0} \frac{\varphi E(t) - \varphi E(t-\Delta T)}{\Delta T} \quad (7)$$

for a very small clock discrepancy (ΔT→0), where:

$$\varphi_E(t) - \varphi_E(t-\Delta T) = \Delta T \frac{d}{dt}\varphi_E(t) \quad (8)$$

Figure 5:
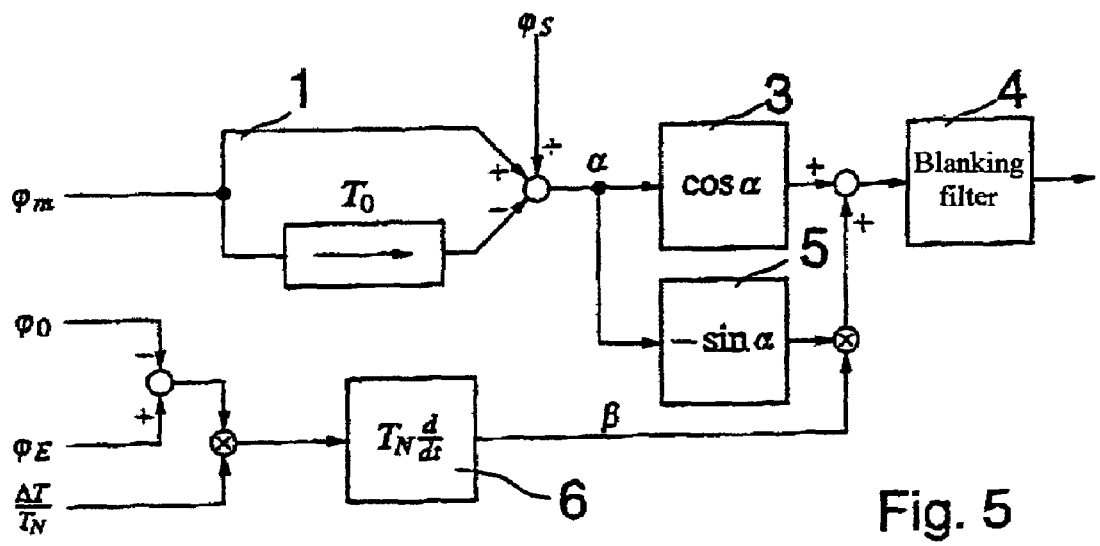
FIG. 5 shows a third modification of the model for synchronous interference.

Thus, as is shown in FIG. 5, this results in the capability to replace the difference formation with respect to the interference $\phi_E$ in the measurement coil which is annotated by the reference symbol 1' by a differentiating element, as can be seen in FIG. 5. $T_N$ is in this case a freely variable normalization constant. As can be seen from the illustration in FIG. 5, a constant $\phi_0$ which can be predetermined is also subtracted from the interference $\phi_E$, but this remains irrelevant since $\Delta T/T_N$ is likewise constant.

Thus:

$$\frac{d}{dt}\Delta t\varphi_0 = 0 \tag{9}$$

The following argument serves as preparation for further reorganization of the block diagram shown in FIG. 5:

During normal operation in FOG, the Sagnac phase $\phi_E$ is approximately constant. The restoring signal $\phi_M(t)$ at the phase modulator within the HIOC is (approximately) a staircase function which is constant, except for narrow, periodically recurring time periods in which the transition to the next staircase function takes place. The narrow regions in which the signal is not constant (switching times) form a set ⊙ of times. In consequence, in addition to $\phi_M(t)$, $\alpha(t)$ and $-\sin\alpha(t)$ are also constant, except at the times defined by ⊙:

$$\frac{d}{dt}(-\sin\alpha(t)) = 0 \text{ where } t \notin \overline{\text{⊙}} \tag{10}$$

On the other hand, the interference $\phi_E$ during the switching intervals t∈⊙ can be regarded as being virtually constant. Since the interference is periodic in T, it assumes this constant value during each switching process. If the variable O which, until now, it has been possible to choose arbitrarily, is now set to precisely this value, then this results in:

$$\phi E(t) - \phi 0 = 0 \text{ where } t \in \text{⊙} \tag{11}$$

then, from equations 10 and 11:

$$(\varphi E(t) - \varphi 0) \cdot \frac{d}{dt}(-\sin\alpha(t)) = 0 \text{ for any } t \tag{12}$$

It now follows from the validity of equation 12 that:

$$-\sin\alpha(t) \cdot \frac{d}{dt}(\varphi E(t) - \varphi 0)\Delta T = \frac{d}{dt}(-\sin\alpha(t) \cdot (\varphi E(t) - \varphi 0 \Delta T) \tag{13}$$

Figure 6:
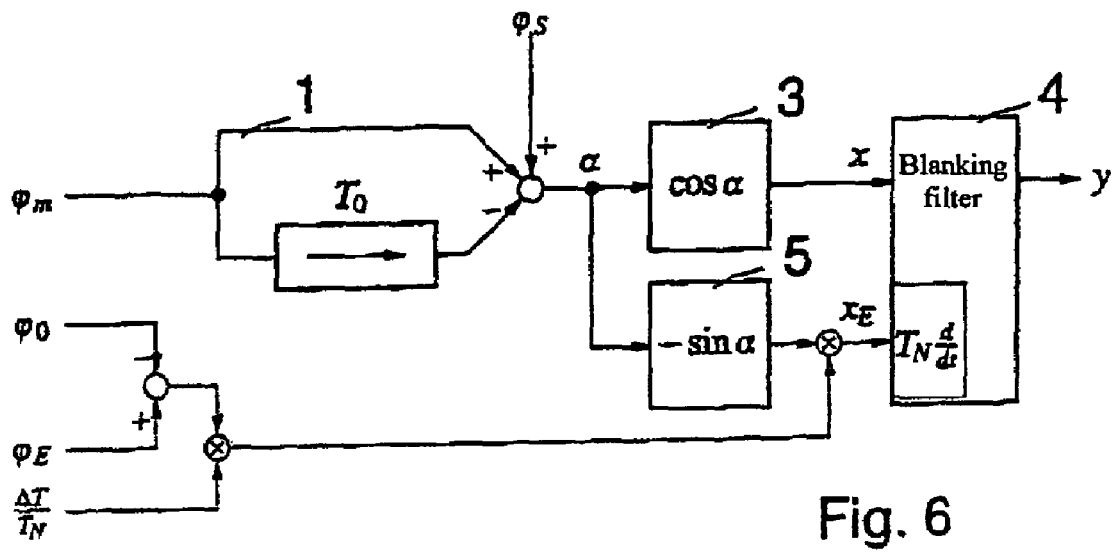
FIG. 6 shows a fourth modification, which has been developed from the third modification, of a model for synchronous interference.

This equation states that, for the proposed choice of $\phi_o$, it is permissible to move the differentiation of the interference signal $\phi_E(t)$ to a point after the multiplication by $-\sin\alpha$. The result of this renewed modification is shown in FIG. 6. In this case, the differentiating element which is indicated by the reference symbol 6 in FIG. 5 is added to the output-side blanking filter 4, which is thus provided with a further input.

As will be shown in the following text, it is possible during the synthesis of a time-variable, time-discrete low-pass filter which simulates the specified system of a continuous blanking filter, to obtain this differentiating input automatically.

2. THE MODELLING OF THE BLANKING FILTER

The model of a general, linear, time-continuous and time-variable system La first of all used as the basis for retaining a useable model for the blanking filter. The state variable representation of a system such as this is shown in FIG. 7.

In order to assist understanding, a number of conventions relating to the notation must be explained first of all.

Figure 7:
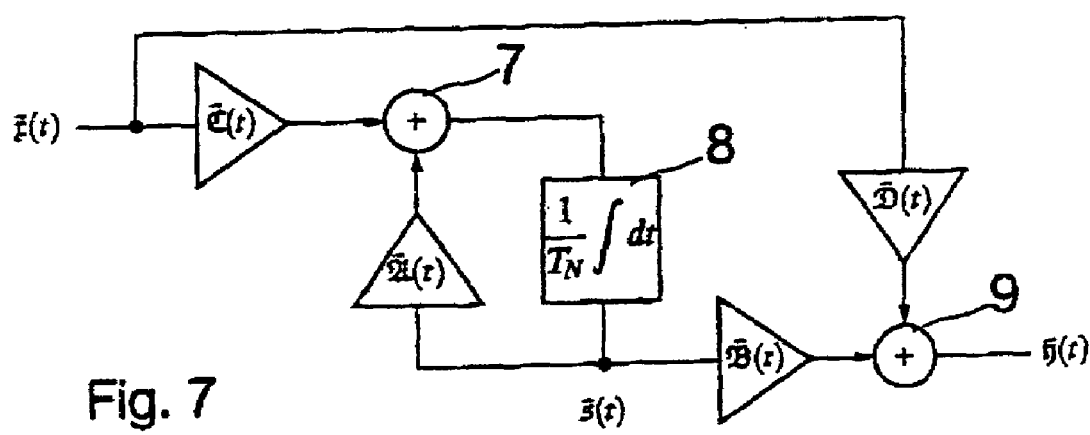
FIG. 7 shows a time-continuous model of the state variable representation of a blanking filter.

In FIG. 7, continuous scalar signals are denoted by lower-case Gothic script letters with a tilde; these are functions of time, for example $\tilde{x}(t)$. Analogously to this, time-dependent scalar gain factors are denoted by capital Gothic script letters, for example $\tilde{A}(t)$. These functions should not be confused with transfer functions. In the discrete case, signals are denoted by sequences. These are functions with an integer argument, expressed by lower-case gothic script letters without a tilde, for example x(n). in a corresponding manner, gain factors in discrete systems are denoted by capital Gothic script letters without a tilde, for example A(n). Signal vectors occur in the state variable representation that is introduced in the following text: these are denoted by lower case gothic script letters, to be precise when continuous with a tilde, for example $\tilde{r}(t)$ and when discrete without a tilde, for example r(n). In this case, time-dependent matrixes generally occur in place of scalar gain factors, and these are denoted by capital gothic script letters. A continuous coefficient matrix has a tilde, for example $\tilde{A}(t)$, while in the discrete case the tilde is missing, for example A(n). The state variables of the general, linear, continuous and time-variable system are shown in FIG. 7. The (vectorial) input signal $\tilde{r}(t)$ is passed after multiplication by the matrix $\tilde{C}$ and an adder 7 to an integrator 8, whose output signal $\tilde{s}(t)$ is the so-called state vector. After multiplication by $\tilde{A}$, this signal is fed back via the adder 7 which has been mentioned to the integrator input. The output signal $\tilde{y}(t)$ is obtained from the superimposition of the input signal weighted by $\tilde{D}(t)$ and the state vector weighted by $\tilde{B}(t)$ in an adder 9:

$$\tilde{s}(t) = \tilde{C}(t)\tilde{r}(t) + \frac{1}{T_N}\int_{-\infty}^{t} \tilde{A}(\tau)s(\tau)d\tau \tag{14}$$

$$\tilde{y}(t) = \tilde{D}(t)\tilde{r}(t) + \tilde{B}(t)\tilde{s}(t) \tag{15}$$

Figure 8:
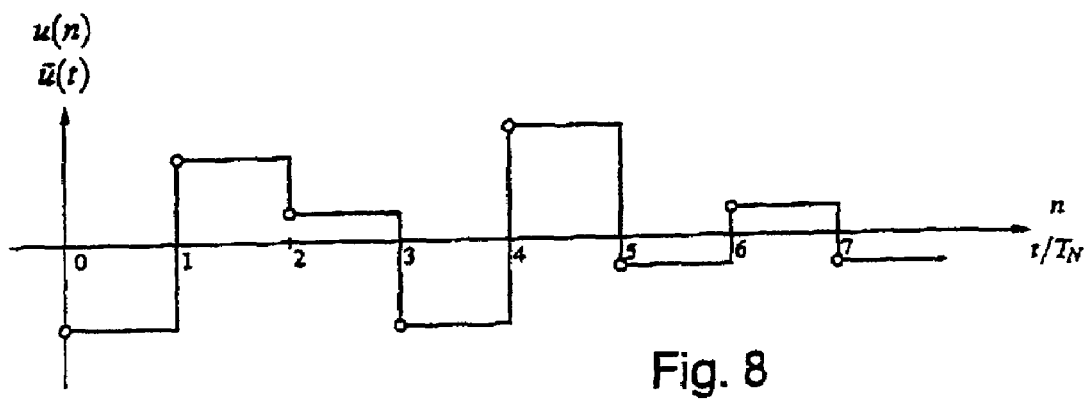
FIG. 8 shows an example of a staircase profile of a function ũ(t) and of its sample values u(n)

Let us now assume that the time function of all the components of the input signal $\tilde{r}(t)$ and of the matrixes $\tilde{A}$, $\tilde{B}$, $\tilde{C}$ and $\tilde{D}$ has a staircase peripheral as represented by the function $\tilde{u}(t)$ in FIG. 8. This function has discontinuities at the points $t = nT_N$, but is constant between the discontinuities.

The limit values on the right-hand side of the respective discontinuities are used as sample values $u(n) = \tilde{u}(nT_N)$ as is indicated by small circles in FIG. 8.

Figure 9:
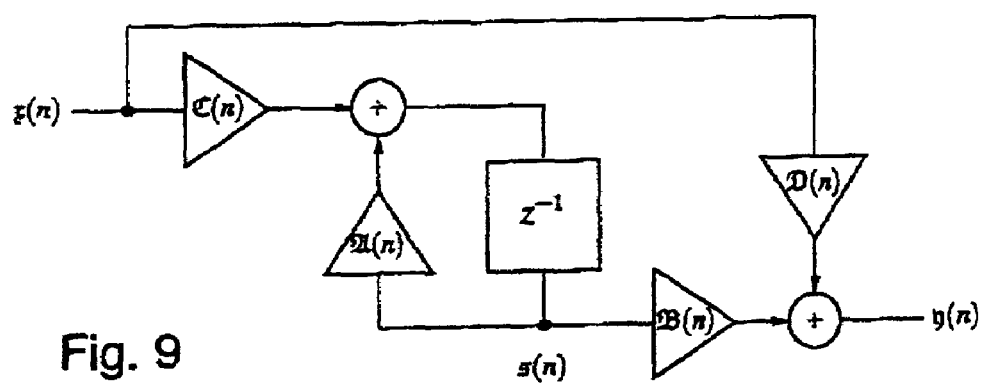
FIG. 9 shows a time-discrete equivalent model for a general time-continuous model as shown in FIG. 7 for an operating mode which takes account of the staircase function in FIG. 8.

In this operating mode, the continuous system can be described by a discrete equivalent model as shown in FIG. 9, with the coefficient matrixes in this system being calculated as follows (assuming that "1" is the unit matrix):

$$A(n) = e^{\tilde{A}(nT_N)} \tag{16}$$

$$B(n) = (nT_N) \tag{17}$$

$$C(n) = \tilde{A}^{-1}(nT_N)e^{\tilde{A}(nT_N)} - 1)\tilde{C}(nT_N) \tag{18}$$

$$D(n) = \tilde{D}(nT_N) \tag{19}$$

Where the exponential function of a square matrix X is defined as follows:

$$e^x = \sum_{i=0}^{\infty} \frac{X^i}{i!} \qquad (20)$$

What has been stated above applies to the formation of the sample values of the discontinuities. For the discrete signals in the equivalent model, $$r(n) = \tilde{r}(nT_N) \qquad (21)$$

$$s(n) = \tilde{s}(nT_N) \qquad (22)$$

$$y(n) = \tilde{y}(nT_N) \qquad (23)$$

The differential equations which can be used to characterize the equivalent system are:

$$s(n+1) = C(n)r(n) + A(n)s(n) \qquad (24)$$

$$y(n) = D(n)r(n) + B(n)s(n) \qquad (25)$$

In order to satisfy the preconditions mentioned initially a differentiating input with the function $$T_N \cdot \frac{d}{dt}$$

must be added to the blanking filter, as is shown in FIG. 6. In conjunction with the modelling of the gyroscope path, $T_N$ was an undefined normalization constant. This constant is now set to the value of the stepwidth of the input signal and of the time-variable constant of the continuous model, and thus to the clock time of the discrete model. In physical terms, $T_N$ is the clock time with which the blanking filter 4 is operated; this is an integer fraction of the clock time T of the modulation at the phase modulator of the MIOC:

$$T_N \cdot \frac{T}{k} \qquad (26)$$

Physically sensible blanking filters have a low-pass filter characteristic, for which:

$$\tilde{C} = 0 \qquad (27)$$

Figure 10:
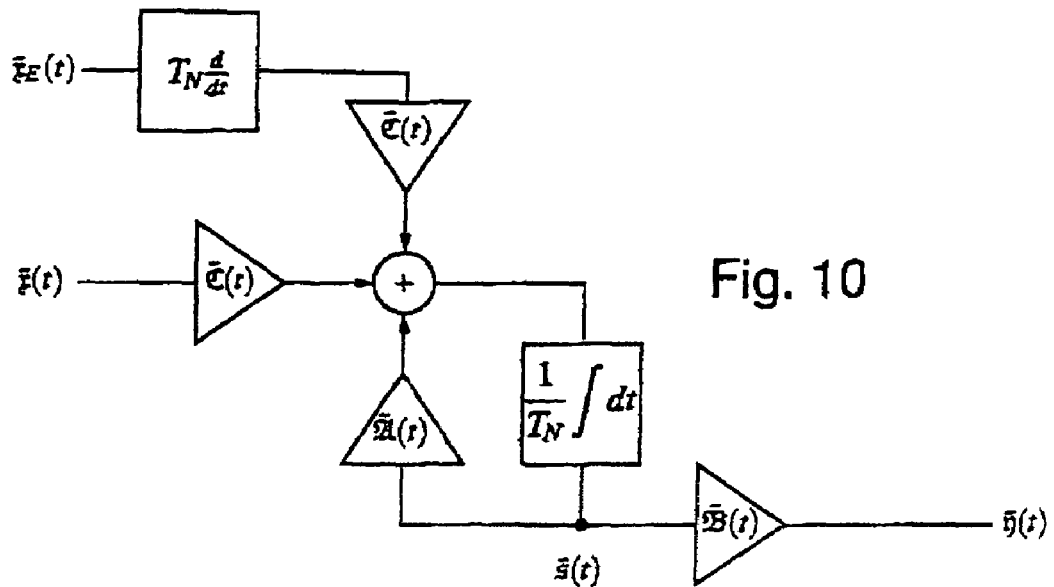
FIG. 10 shows a continuous model, which has been developed from the model shown in FIG. 7, assuming a differentiating input.
Figure 11:
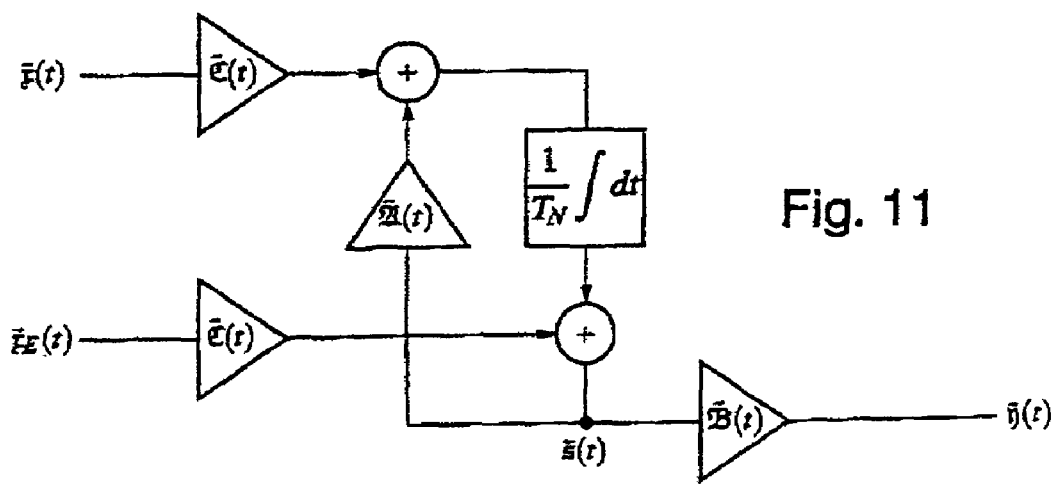
FIG. 11 shows a first modification of the continuous model with a differentiating input as shown in FIG. 10.

Based on this assumption, if a differentiating input is added to FIG. 7, then this results in the diagram shown in FIG. 10. As can easily be seen, the functions of the differentiating element and of the integrator compensate for the state variables, so that the feed for the signal to be differentiated can be moved to the output of the integrator, with the differentiating element being superfluous; see FIG. 11.

A further modification results from shifting the feed points across the matrixes $\tilde{A}$ and $\tilde{B}$ where:

$$\tilde{C}(t) = \tilde{A}(t)\tilde{C}(t) \qquad (28)$$

$$\tilde{D}(t) = \tilde{B}(t)\tilde{C}(t) \qquad (29)$$

Figure 12:
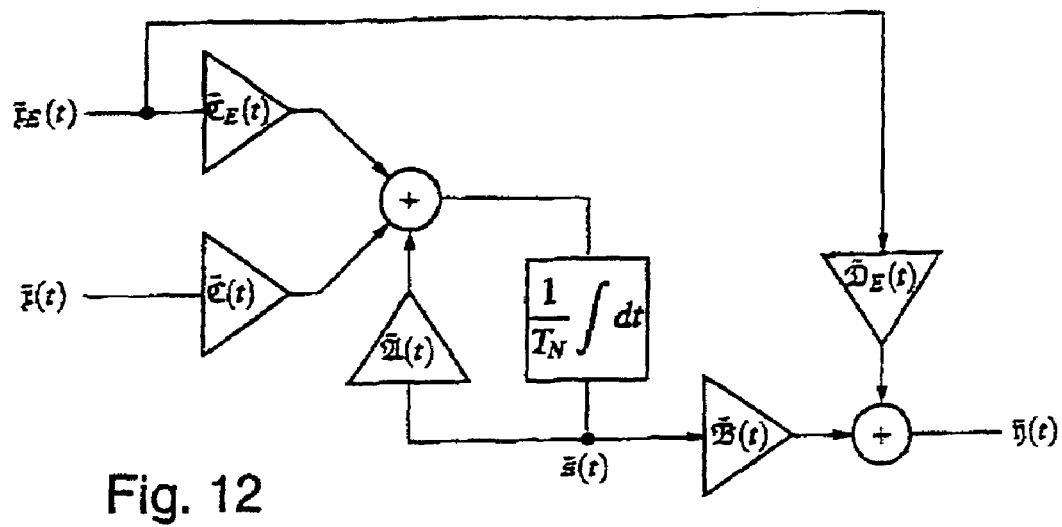
FIG. 12 shows a second modification of the continuous model as shown in FIG. 10 with a differentiating input.

This second modification is shown in the continuous model with a differentiating input as shown in FIG. 12.

Figure 13:
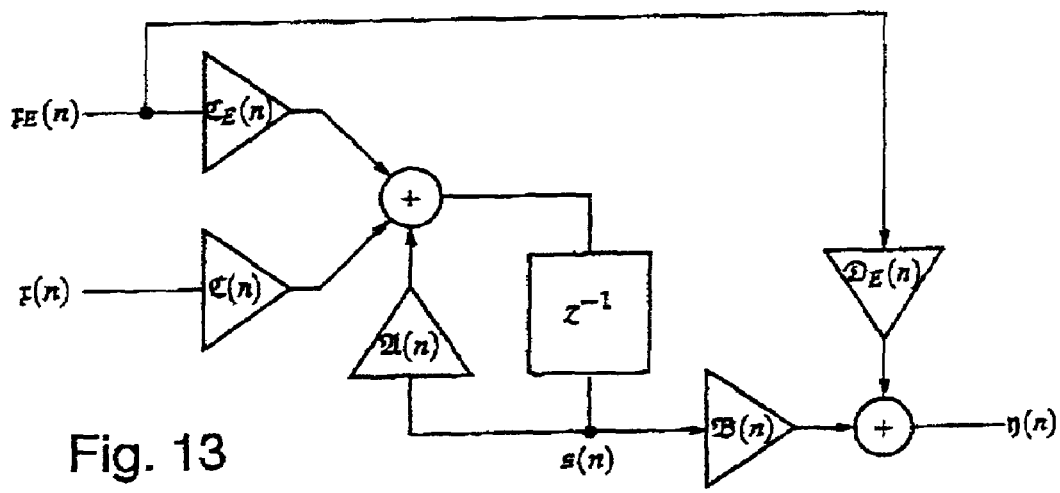
FIG. 13 shows a discrete model (equivalent diagram) according to the second modification of the model as shown in FIG. 12 with a differentiating input.

The signal flowchart now has a form to which the rules mentioned above for conversion to a discrete substitute form can be applied, where:

$$A(n) = e^{\tilde{A}(nT_N)} \qquad (30)$$

$$B(n) = \tilde{B}(nT_N) \qquad (31)$$

$$C(n) = \tilde{A}^{-1}(nT_N)(e^{\tilde{A}(nT_N)} - 1)\tilde{C}(nT_N) \qquad (32)$$

$$C_E(n) = (e^{\tilde{A}(nT_N)} - 1)\tilde{C}(nT_N) \qquad (33)$$

$$D_E(n) = \tilde{B}(nT_N)\tilde{C}(nT_N) \qquad (34)$$

results in the block diagram as shown in FIG. 13 of a discrete model simulation with a differentiating input.

Figure 14:
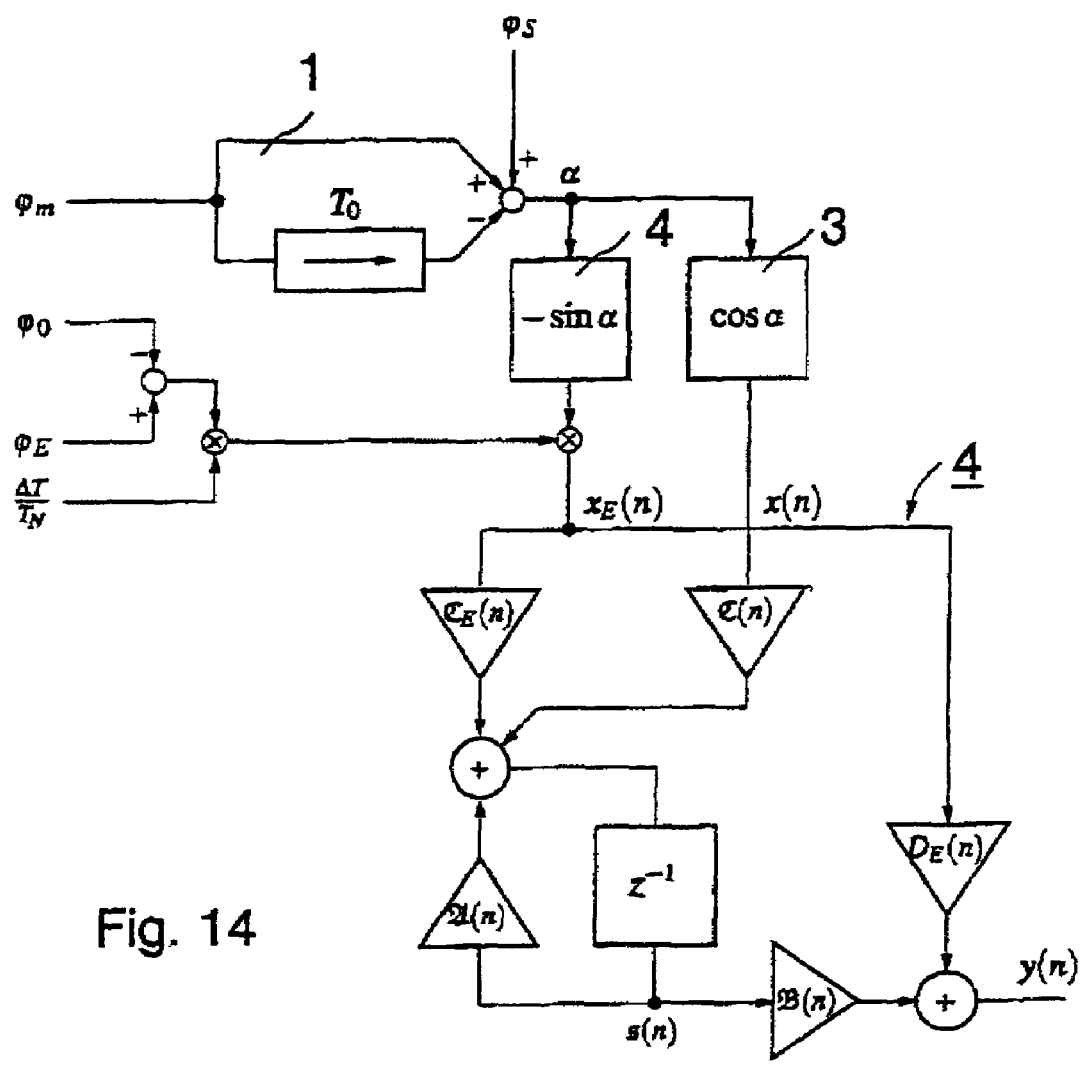
FIG. 14 shows a complete model collated from the illustrations in FIGS. 6 and 13 taking into account the fact that the input and output signals of the blanking filter are scalar.

If the models in FIGS. 6 and 13 are collated, then this results in the complete discrete model of the gyropath including the blanking filter as shown in FIG. 14. In this case, it should be noted that the input and output signals of the blanking filter are scalar, and are thus denoted by x, $x_E$ and y. The coefficient matrix $D_E$ thus changes to the scalar Coefficient $D_E$. It should thus also be mentioned that all the coefficient matrixes are periodic functions. The blanking filter repeats its time-dependent parameters with the period $T = kT_N$; the period of the time-dependent matrixes is thus k.

3. EXAMPLES

Figure 15:
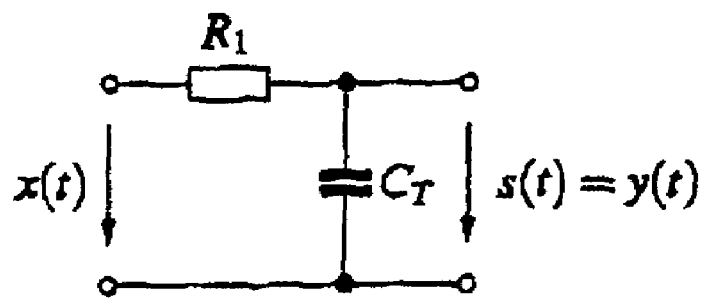
FIG. 15 shows the outline circuit diagram of a low-pass filter.

First of all, the structure shown in FIG. 15 will be used for the blanking filter and, since it is not dependent on time, this represents a pure filter function. This is described by the following differential equation:

$$C_t \frac{ds(t)}{dt} = \frac{x(t) - s(t)}{RI} \qquad (35)$$

whose integration results in:

$$s(t) = \frac{1}{T_N} \int_{-\infty}^{t} \frac{T_N}{R_1 C_T}(x(\tau) - s(\tau)) d\tau \qquad (36)$$

The constant coefficients, which are scalar because the low-pass filter illustrated is a first-order filter, of the continuous state variable model can be read immediately from this, where $T_1 = R_1 C_T$:

$$\tilde{A} = -\frac{T_N}{T_1} \qquad (37)$$

$$\tilde{B} = 1 \qquad (38)$$

$$\tilde{C} = \frac{T_N}{T_1} \qquad (39)$$

with the equations (30) to (34), the discrete coefficients become:

$$A = e^{\frac{T_N}{T_1}} \qquad (40)$$

$$B = 1 \qquad (41)$$

$$C = 1 - e^{\frac{T_N}{T_1}} \qquad (42)$$

-continued $$CE = \frac{T_N}{T_1}\left(e^{\frac{T_N}{T_1}} - 1\right) \quad (43)$$

$$D_E = \frac{T_N}{T_1} \quad (44)$$

Figure 16:
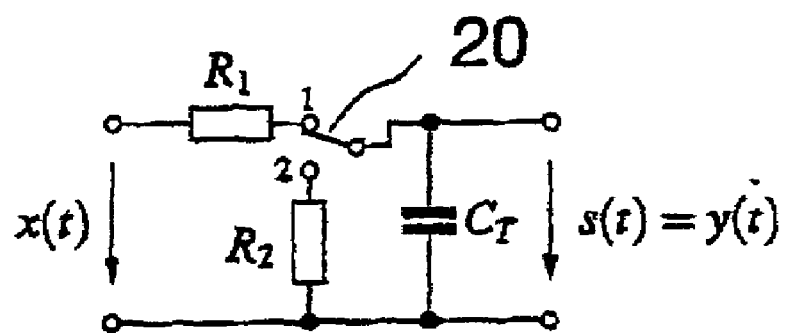
FIG. 16 shows the outline circuit diagram of a low-pass filter with a discharge function.

FIG. 16 shows a low-pass filter with a discharge function. Because it has a built-in switch 20, this has two states. In the state 1, the function is identical to that in previous example shown in FIG. 15. In the state 2, the capacitor $C_r$ is disconnected from the input and is discharged via $R_2$. This results in the following differential equation:

$$C_t \frac{ds(t)}{dt} = \frac{-s(t)}{R_2} \quad (45)$$

or, integrated:

$$s(t) = \frac{1}{T_N} \int_{-\infty}^{1} \frac{T_N}{R_2 C_T}(-s(\tau))d\tau \quad (46)$$

Separate coefficient sets are thus obtained for the two states, with the first being identical to that in the previous example (FIG. 15). The second set follows from equation (46) so that, with $T_2 = R_2 C_T$ this finally results in:

$$A_1 = e^{\frac{T_N}{T_1}} \quad (47)$$

$$A_2 = e^{\frac{T_N}{T_2}} \quad (48)$$

$$B_1 = 1 \quad (49)$$

$$B_2 = 1 \quad (50)$$

$$C_1 = 1 - e^{\frac{T_N}{T_1}} \quad (51)$$

$$C_2 = 0 \quad (52)$$

$$C_{EI} = \frac{T_N}{T_1}\left(e^{\frac{T_N}{T_1}} - 1\right) \quad (53)$$

$$C_{E2} = 0 \quad (54)$$

$$D_{el} = \frac{T_N}{T_1} \quad (55)$$

$$D_{E2} = 0 \quad (56)$$

A time-discrete periodic sequence can now also be constructed from the coefficient acts that have been found. This is shown here by way of example on the basis of the coefficient A(n):

A period T comprises k clock cycles $T_N$ of the filter; the example is based on the assumption that k=8. At the start of a period, the low-pass filter is assumed to be in the discharge position:

$$A(1) = A_2 \quad (57)$$

The low-pass filter is assumed to be in the operating position of the remaining 7 clock cycles:

$$A(2 \ldots 8) = A_1 \quad (58)$$

Otherwise, the sequence is continued periodically:

$$A(i) = A(i+8) \quad (59)$$

A corresponding situation applies analogously to the remaining coefficients. The coefficient sets are calculated before the start of the simulation and are used by the discrete state model corresponding to the periodic sample pattern. The periodic switching of the coefficients that this results in can be represented by switches 21, 22 in the specific situation shown in FIG. 17, with these switches 21, 22 changing periodically between the states "1" and "2".

According to the invention (see FIG. 1), that part of an FOG which comprises the phase modulator within the MIOC 11, the fiber-optics, the detector 10 and the blanking filter 4 can thus be modelled for the situation of an mismatch with a synchronous interference signal input, by means of a time-discrete theoretical system model. The filter function which is connected downstream from the detector may have any desired order and may have any desired constant time dependency on an individual basis in time with the simulation clock. A function which is constant element by element with the same timing is in this case likewise and permissibly assumed for the synchronous interference, and is periodic in time with the MIOC modulation clock. The signal flowchart and the coefficients have been described explicitly above for the situation of a low-pass filter with a discharge function as the blanking filter. As can be seen from FIG. 17, the interference takes the following path in this example: it is weighted by the mismatch $\Delta T$, is then modulated with $-\sin \alpha(t)$ and then, in addition to a normally filtered component, also then produces a direct component, which is supplied via the coefficient $D_{E1}$, at the output of the blanking filter 4.

Figure 17:
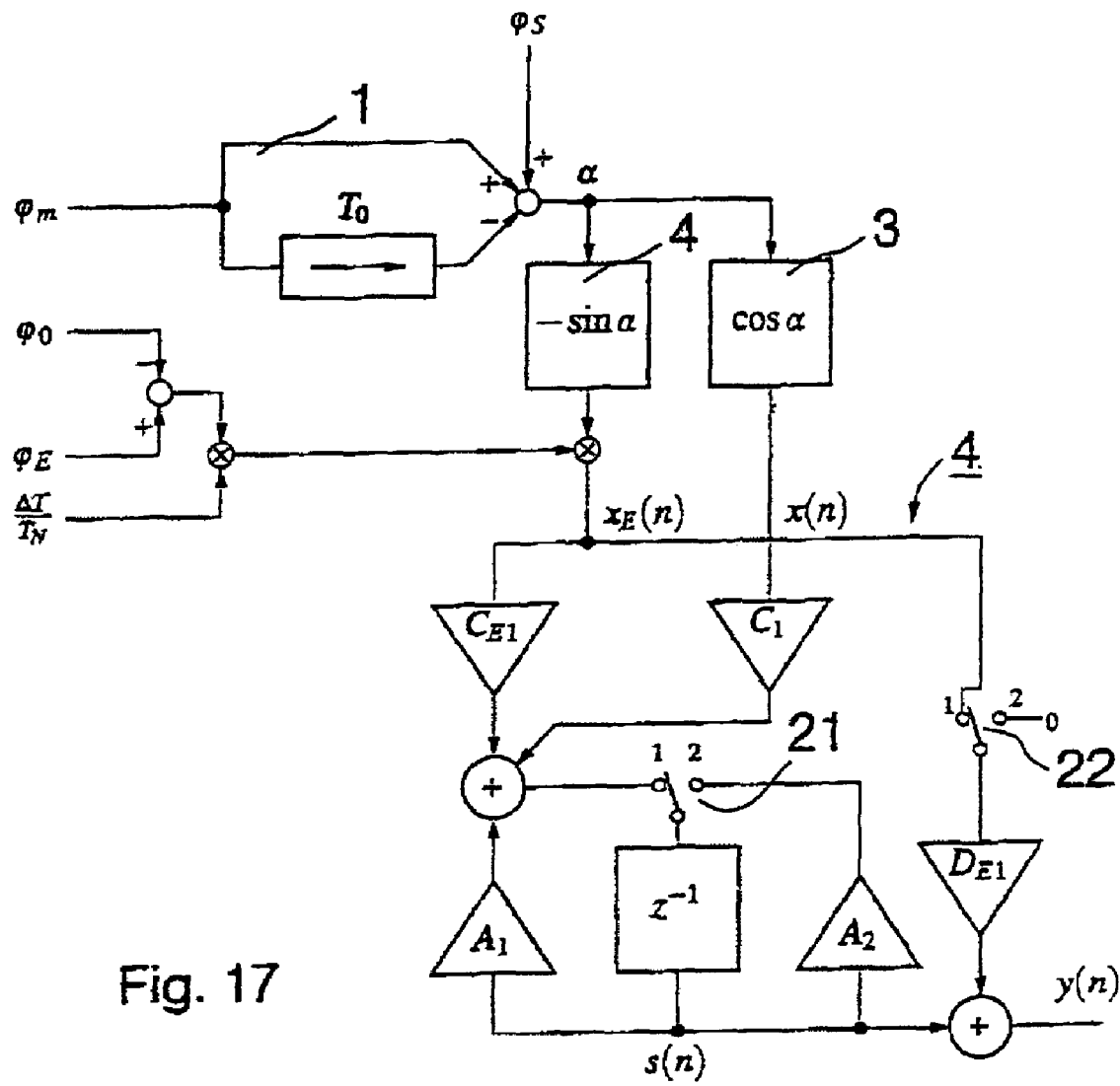
FIG. 17 shows a complete time-discrete theoretical system model with a first-order blanking filter.

From the system analysis described above and the model description, the information about the mismatch can be used to form a control loop with a voltage controlled oscillator VCO 12 (FIG. 1). In this case, as described above, a signal $\phi_E$ which is periodical in time with the sampling clock and corresponds to the synchronous interference signal input is added in the form of additional modulation to the modulation signal for the phase modulator MIOC 11. As is shown in FIGS. 14 and 17, this signal now appears in a weighted form with the normalized mismatch $\Delta T/T_N$, possibly modulated with the respective mathematical sign for random modulation ($-\sin \alpha$) and multiplied by a function DE, which is dependent on the filters at the output of the detector 10, at the output y(n). If $\phi_E$ is (inadvertent) synchronous interference, the interference caused by it in y(n) leads to a zero-point error, after its demodulation. Otherwise, the FOG 100 is operated normally. An additional modulation device 15 is provided in addition to the FOG demodulator 13 and the FOG main regulator 14. The reset signal for the phase modulator in the MIOC 11 is obtained after demodulation of the detector signal by means of the FOG main regulator 14 which, if necessary, also produces the random Modulation (see EP 0 441 998 B1 and EP 0 551 537 B3). In addition, however, the demodulated detector signal $\phi_M$ is, according to the invention, also correlated with the additional modulator $\phi_E$, that in to say it is multiplied by it and added to it. This added-up signal, which is dependent on the mismatch, controls the VCO 12 via the blanking filter 4, and the VCO 12 readjusts the operating frequency until the correlation turns to zero, as is the case when $\Delta T/T_N=0$. The mismatch is thus regulated to zero via this further auxiliary control loop.

The invention claimed is:

1. A method for preventing bias errors as a result of synchronous interference in fiber-optic gyroscopes with a closed loop comprising the steps of:
 applying additional modulation, periodic with respect to the reciprocal of the operating frequency, to the modulation signal at the phase modulator of the gyroscope,
 detecting the remainder of the additional modulation in a demodulated detector signal, and
 using the detected signal from the remaining additional modulation to drive an auxiliary control loop, which readjusts the operating frequency such that the additional modulation tends to zero within technically predetermined limits.

2. The method as claimed in claim 1 comprising the additional steps of:
 correlating the demodulated detector signal with the signal from the additional modulation, and
 using the correlated signal to drive the auxiliary control loop, which readjusts the operating frequency such that the correlation tends to zero within the predetermined limits.

* * * * *